3,830,789
SOAP STOCK RECLAMATION PROCESS FOR PRODUCING FATTY ACIDS, GLYCERINE AND SALTS
Roger L. Garrett, Alexandria, Va., Charles B. Garrett, Jr., Robesonia, Pa., and Alan B. Rubin, Fairfax, Va., assignors to Adams Laboratories, Inc., Alexandria, Va.
Filed Dec. 11, 1972, Ser. No. 313,846
Int. Cl. C11c 1/08; C09f 1/00
U.S. Cl. 260—97.6
7 Claims

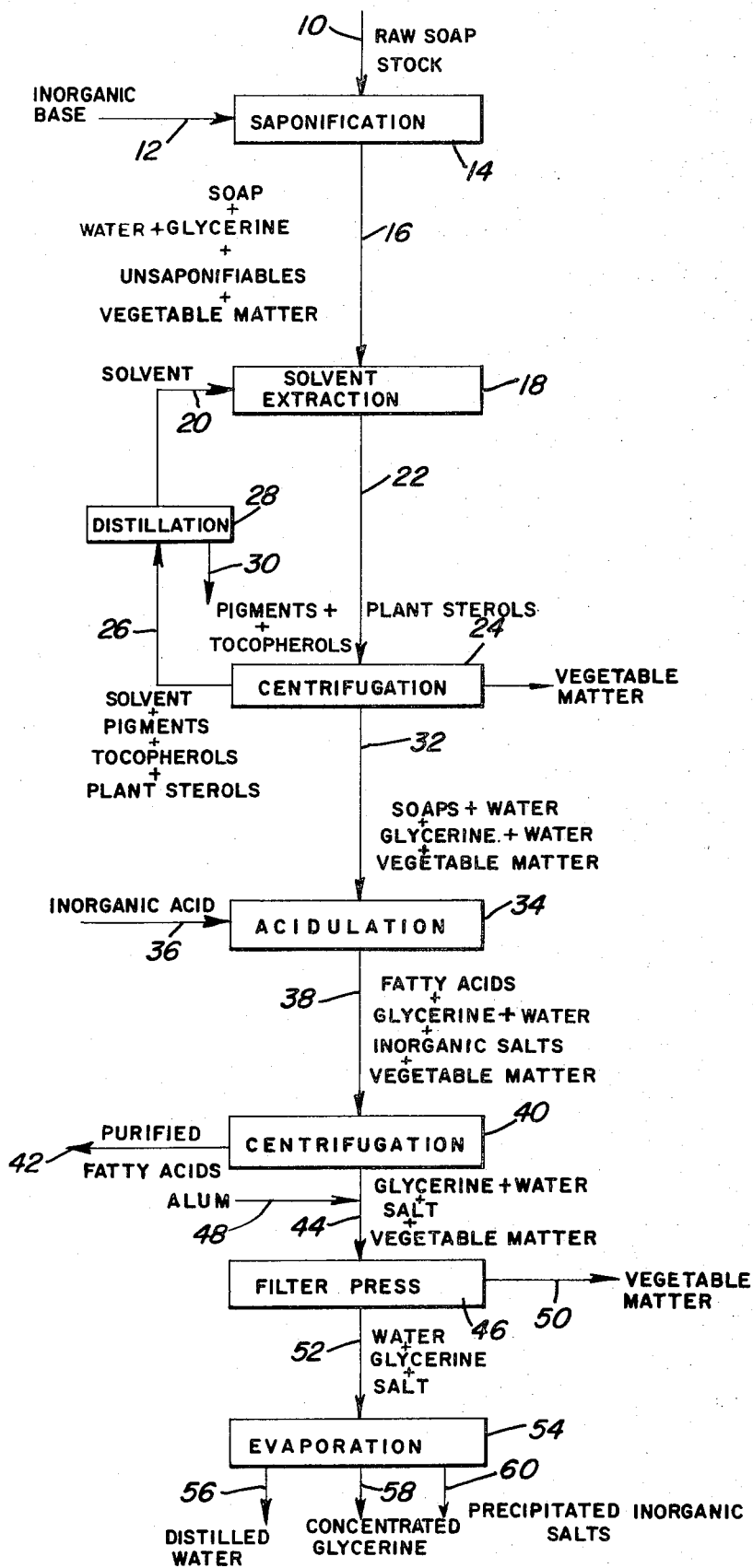

ABSTRACT OF THE DISCLOSURE

Raw soap stock is saponified to a completely water soluble form which enables efficient separation of pigments and tocopherols and increases fatty acid yields during latter steps. The saponified solution undergoes solvent extraction to remove water insoluble pigments and tocopherols. The remaining aqueous solution then undergoes acidulation to convert soaps to water insoluble free fatty acids. Centrifugation causes the removal of purified fatty acids that have great economic worth. The remaining aqueous solution contains glycerine, salt and suspended particles of seed meal. The seed meal is flocculated and filtered from the solution and is collected as a valuable by-product. A final evaporation step separates the components of the aqueous solution into concentrated glycerine and precipitated inorganic salts, both having economic worth.

FIELD OF THE INVENTION

The present invention relates to the reclamation of fatty acids from soap stock, and more particularly to a reclamation process of this type that also produces pigments, tocopherols, high protein vegetable matter, glycerine and inorganic salt in relatively pure form, as economically valuable by-products.

BRIEF DESCRIPTION OF THE PRIOR ART

In the generally practiced method of refining vegetable oils, the crude oil is treated with sufficient caustic soda solution to neutralize the free fatty acids present with the formation of soap and to react with gums, color imparting bodies and other impurities also present in the oil. In the process, the soap, precipitated impurities and emulsified excess caustic soda solution containing some dissolved impurities, are coagulated by proper temperature control to facilitate separation from the refined oil, and because of the emulsifying power of the combination, an appreciable amount of neutral oil becomes emulsified with the soap, excess lye and impurities. This combination of soap, excess lye, impurities and emulsified oil is referred to generally in the industry as soap stock.

The soap stock formed in this way is separated from the main body of the refined oil either by gravity or centrifugally and may be sold for soap manufacture. Normally, however, it is acidulated to recover the emulsified oil and fatty acids present. This acidulation is usually accomplished in the industry in a batch type operation by boiling the soap stock after the addition of sulfuric acid considerably in excess of the amount needed to decompose all the soap present. The acidulated soap stock obtained by this treatment contains a substantial percentage of the impurities and color bodies present in the raw soap stock and is, in general, considered to be of very poor quality. The neutral oil contained in the soap stock is also present in this acidulated soap stock and it is normally further treated, as by twitchellizing or hydrolyzing to convert this neutral oil to fatty acid. Following this treatment, the hydrolyzed or twichellized mixture is usually distilled to obtain fatty acids of a usable quality.

A primary problem of prior art acidulation techniques resides in the fact that pollution problems result. After soap stock is acidulated, and the oils and fatty acids are removed, there remains a great volume of acrid acid water and sludge which is extremely difficult and costly to dispose of. Such material characteristically possesses a high biological oxygen demand (BOD) and high levels of suspended solids, both of which are detrimental to the environment. Attempts are currently made to contain this waste in lagoons where the waste is aerated to inhibit bacteria growth and subsequent odor problems. However, this method has been less than successful, particularly in light of the relatively large quantities produced during typical production runs.

Other attempts have been to feed the acid water and sludge material into municipal sewerage treatment plants. However, municipalities are becoming increasingly aware of pollution problems caused by industrial waste, and the municipalities are increasing their restrictions as well as surcharges for the treatment of this waste material. As a result, municipal sewerage treatment of the waste is becoming economically impractical.

BRIEF DESCRIPTION OF THE PRESENT INVENTION

The present invention is an improvement over the prior art fatty acid recovery processes. By introducing additional physical and chemical process steps, the raw soap stock is made to yield more economically valuable by-products than has been previously accomplished. Also, by virtue of the present invention, there is no end waste to cause a pollution problem. Otherwise stated, the process is made to yield only economically worthwhile by-products and chemicals with substantially no pollution waste.

This is achieved by saponification of the raw soap stock which converts neutral oils in the soap stock to soap and glycerine. Solvent extraction removes valuable pigments and tocopherols and at the same time increases the value of the fatty acids by significantly improving their color, clarity and purity. Subsequent acidulation these soaps to free fatty acids, glycerine and inorganic salts and filtering removes the seed meal. Thereafter processing separates these chemical components into relatively pure form, ready for the marketplace.

Certain pigments such as the xanthophylls are also an important ingredient in present day poultry rations in order to supply the proper amount of yellow coloring to the skin and egg yoke as dictated by consumer preference. Numerous pigment products produced from plant matter are currently marketed to the poultry industry for this specific purpose.

Tocopherols are extremely valuable compounds in both animal and human nutrition and constitute the natural source of Vitamin E present in both animal and human vitamin supplements.

In recent years, animal and vegetable fats have been added to regular poultry and other stock feeds to foster rapid and efficient growth. For example, regular poultry feeds are made up of various combinations of grains with certain additives. Intensive research work has uncovered the fact that the addition of animal or vegetable fat as a high energy feed supplement causes the poultry to put on weight with less feed consumed and in a shorter period of time, thus reducing the poultry producers' cost per pound of meat.

The present invention is cognizant of this nutritional fact and is particularly adapted to yield fatty acids that are used as feed supplements. Further, the sludge that is produced by prior art fatty acid recovery methods is specially processed to yield high protein vegetable matter that may also be used as a feed supplement. The two remaining by-products are glycerine and inorganic salt. These by-products are produced as relatively pure substances that can be used directly by the chemical industry.

Accordingly, the present invention achieves the reclamation of fatty acids from soap stock in a manner obviating prior pollution problems. In addition, a greater yield of economically valuable by-products are obtained so that the overall process can result in substantial profit.

The above-mentioned objects and advantages of the present invention will be more clearly understood when considered in conjunction with the accompanying drawings, in which:

BRIEF DESCRIPTION OF THE FIGURE

The drawing is a flow diagram showing the various steps required to perform the process of the invention.

DETAILED DESCRIPTION OF THE INVENTION

Although the previous prior art discussion related to the processing of raw soap stock, derived from vegetable oil refining, the present invention is equally applicable to by-products of other types of oil refining, such as the by-products of pulp and paper production, lubricants from the steel and metal fabricating industries and fats and oil from the chemical industry. Thus, tall oils, tall oil fatty acids, tall oil residues, such as heads and pitch animal fats and fatty acids, and fatty distillate residues can be used as well. In addition, any lubricant, waste oil or waste oil sludge of a hydrocarbon base can be utilized as long as the criterion of a significant soap content is met. This includes roller mill oils, cutting oils and water soluble oils of all types.

If raw soap stock is used as an input material, its composition is approximately eight to thirty percent soap, six to twenty percent oil (esters), one to two percent glycerine, a fraction of a percent vegetable matter, and the remainder being water.

The raw soap stock is introduced into the process at 10 where it is reacted with an inorganic base, such as sodium hydroxide to effect the first step of the process, namely, saponification at 14. The purpose of the saponification step is to decompose the oil in the soap stock to soap and glycerine in a water soluble form. As a result, the percentages of soap and glycerin in the original aqueous solution now has the following typical percentages of components: Fourteen to fifty percent soap, two to four percent glycerine, a fraction of a percent vegetable matter, and the remainder being water. The increase in soap is due to the reaction of the oil with the inorganic base during saponification. The saponification step also increases the glycerine content and subsequent yield due to the decomposition of the ester bonds that link glycerides and fatty acids.

The result of the saponification step is shown at 16 to include soap, glycerine, unsaponifiables, vegetable matter in aqueous solution. In actuality, the unsaponifiables contain such economically valuable by-products as natural pigments and tocopherols.

To obtain the unsaponifiable pigments and tocopherols, the aqueous solution 16 undergoes solvent extraction at 18 whereby an organic solvent, such as hexane, diethyl ether, petroleum ether or mixtures thereof, or other suitable organic solvent, is mixed at 20 with the aqueous solution from 16. A two phase liquid results wherein the unsaponifiables are dissolved in the solvent, which forms a top phase while the remaining components form a lower phase. The lower phase includes water, soap, glycerine and seed meal. The two phase liquid undergoes centrifugation at 24 wherein the solvent containing the unsaponifiable pigments and tocopherols is separated at 26 from the remaining aqueous solution at 32, which includes soap, glycerine and vegetable matter. The solvent containing the unsaponifiables is monitored and adjusted for its pH by apparatus discussed hereinafter. Adjustment of the pH is necessary inasmuch as the solvent was previously mixed with an alkaline medium with a pH greater than 7. Accordingly, acid must be added to neutralize the pH. This is done automatically by the apparatus to be discussed hereinafter. A distillation step at 28 separates the solvent from the unsaponifiables so that the unsaponifiable pigments and tocopherols can be recovered at 30.

The natural pigments and tocopherols at 30 have substantial economic worth to the feed industry. The pigments provide essential biological coloring agents for poultry and eggs while the tocopherols furnish vitamin E supplementation of the feed. The pigments can be separated from the tocopherols by further molecular distillation or batch chromatography (not shown) after 30. The pigments and tocopherols when recovered from the solvent are extremely susceptible to oxidation and therefore, it is recommended that an antioxidant be added to preserve the pigments and tocopherols prior to solvent evaporation. One recommended antioxidant is BHT. Further, a purified protective carrier oil, such as the free fatty acids produced from the inventive process, should be added to protect the pigments and tocopherols during handling. This additional precaution further inhibits the oxidation and/or decomposition of the natural pigments and tocopherols.

It is important to note at this point that if lubricants or tall oil are used, rather than soap stock, any inorganic base such as sodium hydroxide, potassium hydroxide, etc. may be used and the unsaponifiables are not the natural pigments and tocopherols. If lubricating oils are used, hydrocarbon oils are derived. If tall oils are used, rosin acids and other terpenes are derived. Such material would also possess a relatively high degree of purity and would consequently be of significant economic value.

It is also important to note at this point that if lubricants, tall oils, animal fats or other materials containing potentially toxic chlorinated hydrocarbons, such as polychlorinated biphenyls, polychlorinated terphenyls, polychlorinated dibenzodioxans or chlorinated pesticides such as DDT, these compounds are unsaponifiables and as a result are removed from the fatty acids during solvent extraction. This step constitutes an important process in removing these harmful chlorinated materials from the fatty acids which may subsequently be introduced into the food chain.

The aqueous solution that results after centrifugation is indicated by reference numeral 32 wherein the primary components are soaps, glycerine and vegetable matter. It is now desired to convert the soaps to fatty acids. This is done by an acidulation step 34 which includes the addition of inorganic acid 36 to the aqueous solution at 32. This produces a free fatty acid mixture which is insoluble in water and will therefore separate from water. Thus, a two phase liquid becomes manifest; the upper phase contains fatty acids while the lower phase includes glycerine, inorganic salts and vegetable matter. These components remain in an aqueous solution and can therefore be separated from the upper phase containing fatty acids via centrifugation at 40. The salts are inorganic salts and can be pre-selected by using a complementary inorganic acid at 36. Thus, if a sulphate salt is desired, sulphuric acid is used. On the other hand, if a phosphate is desired, phosphoric acid is used. Therefore, any inorganic acid may be used for the acidulation step and the corresponding salt obtained.

The aqueous solution is continuously monitored for its pH by the same apparatus as previously mentioned and discussed hereinafter. The adjustment of the pH here is necessary inasmuch as the aqueous system should contain sufficient hydrogen ion content to completely convert all soaps to fatty acids but not contain an excess so as to make this step more costly or subsequent purification steps more difficult.

Because of the two phase resultant liquid, centrifugation at 40 easily separates the purified fatty acids at 42 from the lower phase components, in an aqueous solution, indicated at 44. The purified fatty acids form the principal derivative of the process and is of primary economic concern. The fatty acids can undergo subsequent processing if desired. Thus, to render the fatty acids completely colorless, a bleaching process takes place by mixing the purified fatty acids with diatomaceous earth, otherwise known as bleaching earth. Thereafter, if trace amounts of moisture need be removed from the fatty acids, this can be done by conventional dry flash procedures. These purified fatty acids, as such, would meet or exceed specifications for similar materials currently issued by the chemical industry or they may be subsequently fractionated into component fatty acids by means of distillation. However, when using the fatty acids for animal feed, such subsequent processing such as bleaching, drying or fractional distillation is unnecessary.

The remaining aqueous solution at 44 is introduced into a filter press 46 where the finely suspended vegetable matter is removed and collected from sale to the feed industry. The vegetable matter has been carried throughout the process as finely suspended proteinaceous material. By introducing alum at 48 into the aqueous solution from 44, a flocculation is produced which facilitates the filtration and the vegetable material at 50 is removed. The meal is subsequently dried in a drum type or roller type drier to a form ready for utilization as a valuable feed supplement (protein).

The resulting aqueous solution at 52 includes water, glycerin, and inorganic salt. When this solution undergoes evaporation at 54, the three final components are separated and collected for distribution to the chemical industry. These components are distilled water 56, concentrated glycerine of standard technical grade quality (58), and precipitated inorganic salts indicated at 60. The inorganic salts are subsequently dried to remove free and/or bound water depending on their applications. It should be mentioned that the concentrated glycerine can readily be produced at a purity level of eighty-eight percent, which exceeds the specifications for standard technical grade glycerin. This standard technical grade glycerine may be subsequently distilled to produce U.S.P. grade glycerine of greater than 99% purity.

Accordingly, by virtue of the foregoing description of the invention, it will be appreciated that the various steps cause the recovery of valuable by-products from raw soap stock or other oils that have substantial soap content.

The previous discussion of the invention process excluded detailed explanations of the apparatus utilized to carry out the indicated steps. However, the individual steps of the process are, per se, conventional. The invention resides in the particular combination of steps to achieve the collection of by-products, in a manner heretofore unknown. To increase the information content of this specification, particular apparatus for effecting the various method steps will now be discussed.

APPARATUS USED IN THE RECLAMATION PROCESS

The saponification step 14 can be carried out by a saponification system, known commercially as the Sharples ITPS Reactor Model RC-1. This system is available from Sharples Division, Pennwalt Corporation, Warminster, Pa.

The solvent extraction step 18 can be effected by a liquid-liquid solvent extraction system known as the Baker Perkins, Podbielniak Centrifugal Contactor Model D-10. This system is available from Podbielniak, Inc., Bensenville, Ill.

The centrifugation step at 24 can be accomplished by an apparatus known in the trade as the Wurster & Sanger Desolventizer. This apparatus is available from Wurster & Sanger, Chicago, Ill.

The distillation step indicated at 28 can be achieved by the commercially available Wurster & Sanger Rising Film Evaporator and Disc and Donut Stripper. This apparatus is available from Wurster & Sanger, Chicago, Ill.

The acidulation step at 34 can be carried out by the Sharples Nozljector Separator Centrifuge Model BH-3. This system is available from the Sharples Division, Pennwalt Corporation, Warminster, Pa.

As previously discussed, the solvent reclaimed after distillation at 28 and the aqueous solution after acidulation at 38 must undergo adjustments in pH. The means for monitoring and adjusting the pH is manufactured by Leeds & Northrup Company, Philadelphia, Pa. The pH adjustment system is identified in the trade as the Leeds & Northrup Industrial pH Monitor Model 7070.

As previously mentioned, the fatty acids at 42 can undergo bleaching to render the fatty acids colorless. A particular system for accomplishing this is available from Wurster & Sanger and is known as the Wurster & Sanger Continuous Fatty Acid Bleaching System.

The filter press for removal of the vegetable matter at 46 is available from the D. R. Speery Company, Batavia, Ill. The press is identified as -HR Plate and Frame Filter.

The evaporation step indicated at 54 is a combination of systems. Concentrated glycerine is obtained at 58 after the aqueous solution at 52 is treated by a Wurster & Sanger Sweet Water Glycerine Evaporator, covered by U.S. Pats. 1,791,296 and 1,508,130.

Precipitated inorganic salts at 60 are produced by a Sharples Continuous Super-D-Cantor Model No. P-2000.

It is to be emphasized that the above discussion merely sets forth apparatus for manipulating the basic steps of the process. However, the process is not to be construed as being limited to this described equipment.

It should be understood that the invention is not limited to the exact details of construction shown and described herein for obvious modifications will occur to persons skilled in the art.

Wherefore, we claim the following:

1. A method for producing free fatty acids and other valuable materials and chemicals from an oil substance that has a substantial fat, oil, fatty-acid and/or soap content, the method comprising the following steps:
   saponifying the oil substance to form a water soluble liquid containing a higher soap content than present in the oil substance;
   adding solvent to the saponified liquid to form two resulting phases of preselected pH, unsaponifiable material being contained in a solvent phase thereof, while a water soluble liquid forms another phase that is purified due to the absence of unsaponifiables therein;
   separating the phases;
   acidulating the water soluble liquid phase to convert soap therein to free fatty acids;
   separating the unsaturated free fatty acid phase from the water soluble liquid phase; and
   collecting the free fatty acids.

2. The method set forth in Claim 1 wherein the oil substance is soap stock, and the unsaponifiable material includes natural pigments and tocopherols.

3. The method of Claim 1 wherein the oil substance includes oils having a hydrocarbon base and a significant soap content, and the unsaponifiables are hydrocarbon derivatives.

4. The method of Claim 1 wherein the oil substance is tall oil, tall oil fatty acids or tall oil residues, and the unsaponifiables are rosin acids and other terpenes derivable from said oil substance.

5. The method defined in Claim 1 wherein the oil substance is soap stock and further wherein the method includes the step of filtering the remaining acidulated aqueous phase to extract suspended matter therefrom.

6. The process defined in Claim 1 together with the step of evaporating water from the aqueous phase to produce distilled water as a by-product, and leaving a separable mixture of glycerine and inorganic salt.

7. The method defined in Claim 1 together with the steps of:
- collecting the solvent phase;
- removing the solvent from the solvent phase; and
- collecting the unsaponifiable material.

References Cited

UNITED STATES PATENTS

| | | | |
|---|---|---|---|
| 2,285,902 | 6/1942 | Christmann et al. | 260—97.6 |
| 2,373,978 | 4/1945 | Segessemann | 260—97.6 |
| 2,382,890 | 8/1945 | Loughlin | 260—97.6 |
| 2,807,607 | 9/1957 | Ridgway | 260—97.6 |
| 3,138,580 | 6/1964 | Baxley et al. | 260—97.6 |
| 2,276,517 | 3/1942 | Segessemann | 260—97.6 |
| 2,280,842 | 4/1942 | Oliver | 260—97.6 |

FOREIGN PATENTS

| | | | |
|---|---|---|---|
| 498,717 | 12/1953 | Canada | 260—97.6 |

OTHER REFERENCES

Simmons et al., Handbook of Soap Manufacture, Scott, Greenwood (London), 1908, pp. 40–44.

HERBERT S. COCKERAM, Primary Examiner

U.S. Cl. X.R.

23—267 R; 260—415, 540